United States Patent [19]

Hayashi et al.

[11] Patent Number: 4,739,295
[45] Date of Patent: Apr. 19, 1988

[54] DATA STORAGE UNIT SYSTEM

[75] Inventors: Makoto Hayashi, Muko; Kiyohide Okamoto, Ohtsu, both of Japan

[73] Assignee: Omron Tateisi Electronics Co., Kyoto, Japan

[21] Appl. No.: 904,482

[22] Filed: Sep. 8, 1986

[30] Foreign Application Priority Data

Sep. 10, 1985 [JP] Japan ................. 60-201013

[51] Int. Cl.⁴ ............................................. G06F 15/30
[52] U.S. Cl. ..................................... 235/379; 235/492
[58] Field of Search ............................. 235/379, 492

[56] References Cited

U.S. PATENT DOCUMENTS 4,484,304 11/1984 Anderson .............................. 235/380

Primary Examiner—Harold I. Pitts
Attorney, Agent, or Firm—Stevens, Davis, Miller & Mosher

[57] ABSTRACT

An IC card system for storing a first index data designating an area storing the latest data and a second index data designating an area storing the last printed data in an IC card so as to print only the data not printed in the previous operation, or, if desired, the once printed data according to the selection by the operator. The IC card includes a predetermined number of data storage areas for storing a series of transaction data, and the first and second index data to be read by an IC card reader or an automatic transaction terminal.

6 Claims, 6 Drawing Sheets

FIG. 5

| STATEMENT | | | | 10-8-1985 ABC BANK |
|---|---|---|---|---|
| DATE | KIND | AMOUNT | SHOP | BALANCE |
| 8-2-85 | SUIT | 120,000 | A STORE | 1,250,000 |
| 10-2-85 | BOOK | 20,000 | B STORE | 1,230,000 |
| 20-3-85 | DESK | 50,000 | C STORE | 1,180,000 |
| 25-4-85 | SHOES | 20,000 | D STORE | 1,160,000 |
| | | ** END ** | | |

FIG. 7

| STATEMENT | | | | 10-8-1985 ABC BANK |
|---|---|---|---|---|
| DATE | KIND | AMOUNT | SHOP | BALANCE |
| ----- | REPRINT | ---- | ---- | ----- |
| 12-11-84 | BOOK | 30,000 | K STORE | |
| 18-12-84 | FOOD | 5,000 | L STORE | |
| 3-1-85 | LAMP | 10,000 | K STORE | |
| ----- | NEW PRINT | ---- | ---- | ----- |
| 8-2-85 | SUIT | 120,000 | A STORE | 1,250,000 |
| 10-2-85 | BOOK | 20,000 | B STORE | 1,230,000 |
| 20-3-85 | DESK | 50,000 | C STORE | 1,180,000 |
| 25-4-85 | SHOES | 20,000 | D STORE | 1,160,000 |
| | | ** END ** | | |

DATA STORAGE UNIT SYSTEM

BRIEF SUMMARY OF THE INVENTION

This invention relates to a data storage unit system for reading data stored on a data storage unit to print the read data, and more particularly to an improved system which may be applied to a transaction system wherein a customer is assigned a data card and desired data stored on the card may be printed out in a transaction.

Recently there has been proposed an IC card transaction system in which a customer is assigned an IC (integrated circuit) card having a large storage capacity to store her or his shopping data such as date, a kind of merchandize, shopping store name, monetary amount, transaction balance and so forth so that she or he can confirm the shopping data by inserting the IC card into a terminal to read the data stored on the card and print out the read data. The terminal is designed to automatically print out the data of a predetermined number of the latest transactions among the data previously stored on the card. The data printed out by the terminal, however, does not have any continual relation with the former printed data printed in former printing operation. For example, the terminal reprints the formerly printed transaction data, or omits details of the latest transaction data made predetermined time period ago, which is inconventient to the customer who wants to know her or his latest transaction or shopping data which was not printed out in former printing operation.

In accordance with this invention, there is provided a data storage unit system for accepting a data storage unit storing a series of data therein, comprising first reading means for reading a first index data relating to the address of a storage area of the storage unit in which the latest data is stored, second reading means for reading a second index data relating to the address of a storage area of the storage unit in which the last printed data is stored, and printing means in response to the first and second index data for printing out the data not yet printed out previously.

It is, therefore, a primary object of this invention to provide a data storage unit system selectively capable of printing out the data which is not yet printed out in former printing opertions.

It is a further object of this invention to provide a data storage unit system in which a data storage unit is adapted to store information data therein with an index data designating the last printed information data and a unit reader reads out the stored data from the data storage unit to print out the data which is not yet printed out in the former printing operations in accordance with the index data.

It is another object of this invention to provide a data storage unit system in which a customer is assigned an IC card for storing her or his transaction data and can receive printed information which is not printed out in former her or his printing operation so as to find continual transaction data without being confused by unnecessarily doubled printing.

It is still another object of this invention to provide a data storage unit system in which a customer can optionally receive a document in a reprint area thereof reprinted with the data once printed in former operation.

Other objects and object and advantages of this invention will become apparent from the following description taken in conjunction with accompanying drawings in which:

BRIEF DESCRIPTION OF DRAWINGS

FIG. 5 is a printed document according to the machine;

FIG. 7 is a printed document as the modification of the data storage unit system of FIG. 6.

DETAILED DESSCRIPTION

Returning, now, to FIG. 1, there is shown as automatic teller machine 100 (hereinafter briefly called as "ATM") which is applied to a data storage unit system in accordance with a preferred embodiment of this invention. The data storage unit system is represented by an integrated circuit built-in card 20 (hereinafter briefly called as "IC card") as a data storage unit thereof shown in FIG. 2 and the ATM 100 as a reader unit thereof for reading the card.

Figure 1:
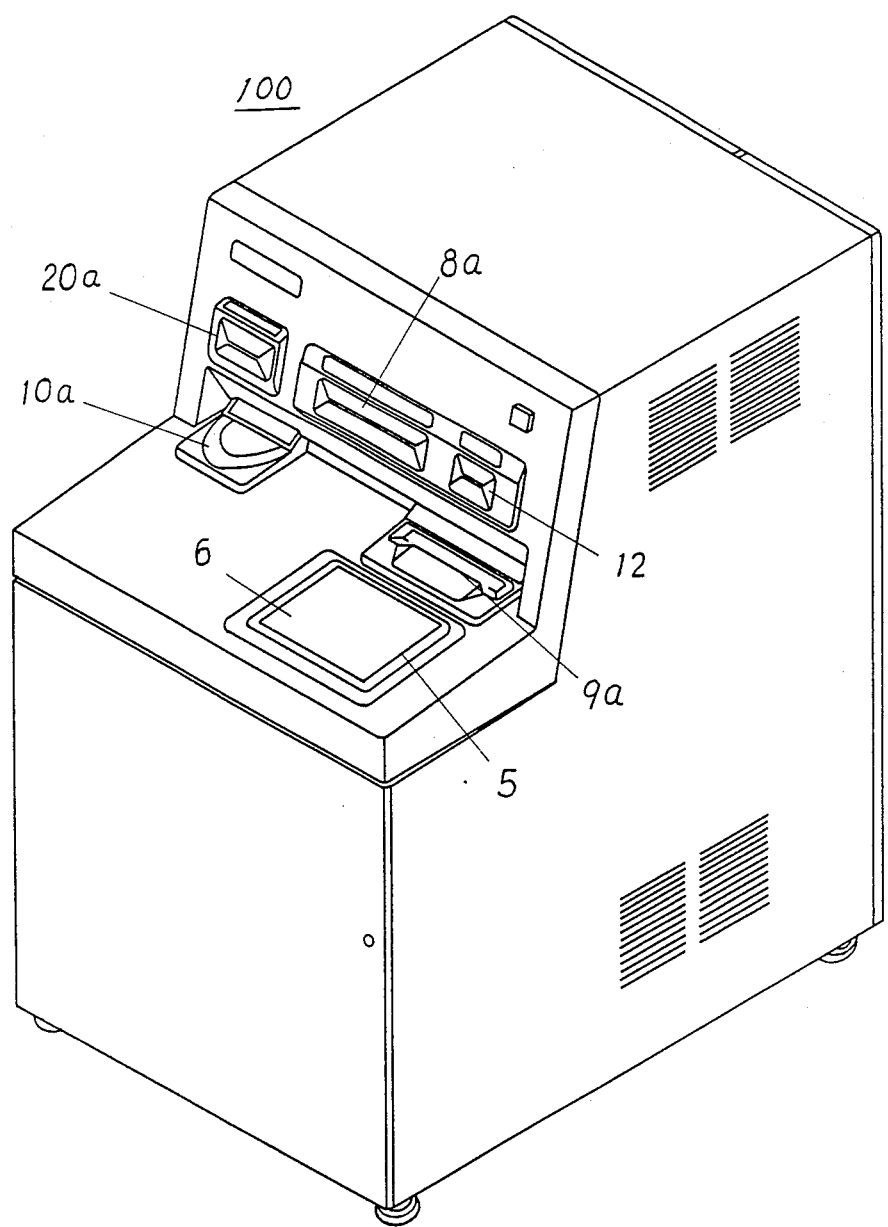
FIG. 1 is a perspective view of an automatic teller machine employing a data storage unit system as a preferred embodiment of this invention.

The ATM 100 of FIG. 1 includes a CRT (cathode-ray-tube) display 5 to display an operation text message to guide an operator how to operate the ATM and a transparent touch panel 6 disposed on a surface of the CRT display 5 as an input member to be actuated by the operator according to the message displayed on the display. When the ATM 100 is requested to work as a normal automatic teller machine in a withdrawal transaction, a bank pass book is inserted into a bank pass book inlet 8a or a bank card is inserted into a card inlet 12 to receive her or his desired monies dispensed from a bank note outlet 9a or a coin outlet 10a.

In an IC card confirmation mode, the customer's IC card is inserted into the ATM 100 through an IC card inlet 20a so that the transaction data stored on the IC card and not yet printed in the former confirmation modes is printed on a statement or a deposit-and-withdrawal record document to be delivered out through an exit 8a.

Figure 2:
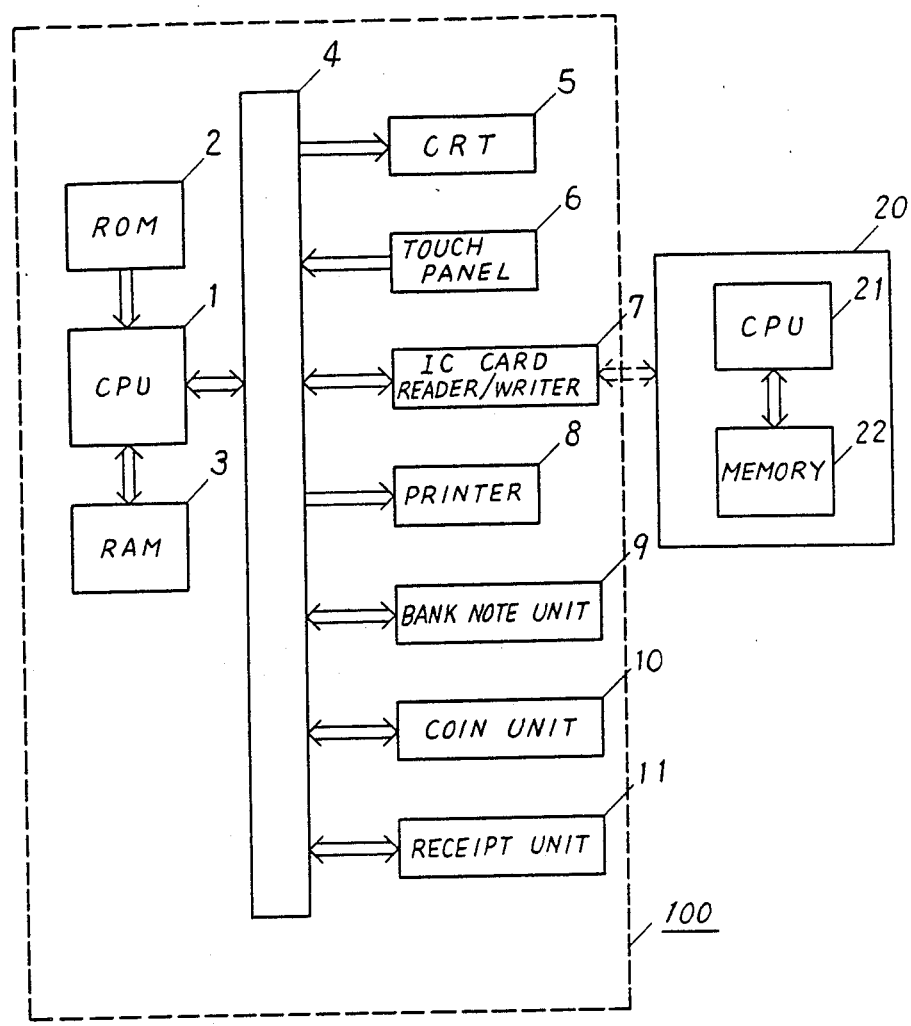
FIG. 2 is a schematic diagram illustrating a construction of the automatic teller machine of FIG. 1 and an IC card as a data storage unit.

FIG. 2 illustrates the data storage unit system composed of ATM 100 and IC card 20. The ATM 100 includes a central-processing-unit (hereinafter called as "CPU") 1 employing a micro-processor to control the ATM, a ROM (read-only-memory) 2 for storing a control program for the CPU 1, and a RAM (random-access-memory) 3 to be used for a working area to execute the stored program. An interface circuit 4 is interposed between the CPU 1 and each of its respective peripheral components for sending signals therebetween.

The peripheral components of CRT display 5 and touch panel 6 are disposed on an operation portion of the ATM 100 as mentioned above. An IC card reader-and-writer 7 is a control circuit for reading or writing a memory 22 of the IC card 20 inserted into the ATM. The card 20 includes the memory 22, and a CPU 21 for reading or writing data on the memory 22 in accordance with a control code produced from the reader-and-writer 7. A printer 8 is disposed to print a document inserted into the ATM with the data to be printed according to the control by the CPU 1 among the transaction data stored in the memory 22. In the automatic teller machine mode, the printer 8 prints a bank pass book with deposit or withdrawal data. Bank note unit 9 and coin unit 10 are disposed to dispense monies through the outlets 9a and 10a respectively under the control by the CPU 1. A receipt unit 11 processes receipts of deposit or withdrawal transactions by bank cards or bank pass books.

Figure 3:
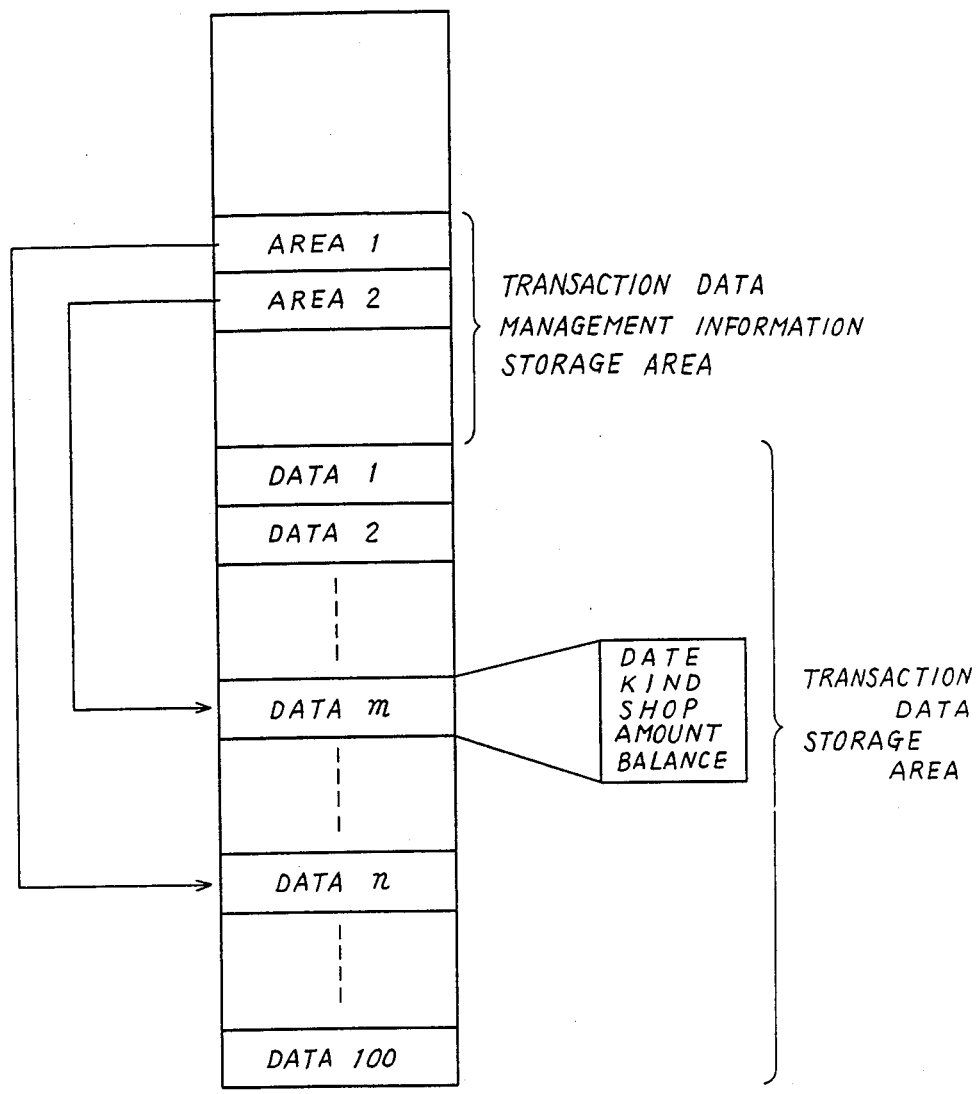
FIG. 3 is a memory map or storage location of the IC card of FIG. 2.

FIG. 3 illustrates storage areas within the memory 22 of the IC card 20 for storing transaction data DATA 1 through DATA 100 represent transaction data storage areas for storing the data of 100 transactions in a sequential rotating fashion. For example, the transaction data of the 101st and its subsequent transactions are written over the areas from the oldest transaction area DATA 1 subsequently. Thus, the data of the latest 100 transactions are stored in the memory 22. The data of each transaction includes data, kind of goods, shop name, monetary amount and balance.

The memory 22 further includes transaction data management information storage areas. A storage area AREA 1 stores a first index data designating the address of an area storing the latest transaction among the one hundred transactions stored in the areas DATA 1 through 100, whereby the area to store the data of the next transaction can be designated. A storage area AREA 2 stores a second index data designating the address of an area storing the data which was finally printed out in the last printing operation among the one-hundred areas DATA 1 through 100. FIG. 3 exemplarily illustrates the area DATA n designated by the first index data and the area DATA m designated by the second index data wherein the data in the areas from DATA m+1 to DATA n are not yet printed out in the former printing operations.

Thus, the data about transactions are stored in the memory of the IC card, and only the data not yet printed is adapted to be printed out on a document.

Returning to FIG. 4 there is shown a flow chart to execute the program by CPU 1. Upon the insertion of the IC card, the card is conveyed to a predetermined position where the card is fixed to be engaged with a connector (not shown in any drawings) (Step n 10). Then, through the connector the data of the transaction data management storage areas including the first and second index data are read out (Step n 12). Then, the second index data (m) designating the storage area DATA m in which the data was printed out in the last print operation is entered into a buffer i, and the first index data (n) designating the storage area DATA in which the data of the transaction is stored is entered into a buffer j (Steps n 14 and n 16). If the data (m) in the buffer i is equal to that (n) in the buffer j, an YES response representing that all transaction data in the memory of the IC card are already printed out is produced from an inquiry step n 18. Unless equal, a NO response is produced from the step n 18 and applied to a step n 20 wherein the summation of the value (m) stored in the buffer i and the value "+1" is divided by the value "100" and its remainder is entered into a buffer x, so that the buffer x is entered by the next area number following to the area designated by the second index data. The division by the value "100" is employed for the case when the value stored in the buffer i exceeds the value 100. In other words, the transaction data storage area is designed to store the data up to 100 transactions and the oldest transaction data is revised by the latest transaction data one by one. Thus, the transaction data in the area designated by the buffer x is read out to be printed on a statement or document which on a previous operation has been inserted within the ATM (Steps n 22, n 24 and n 26). Then, the buffer i is incremented by "+1" (Step 28) and the sequence is returned to the step 20 to be repeated for printing the data of transactions not yet printed out in the order from the oldest. It is inquired in step n 22 if the value in the buffer x exceeds the value in the buffer j or of the first index data. If exceeds, a NO response representing that the printing operation by the printer 8 is completed as shown in FIG. 5 is produced for application to a step n 30 in which the second index data in the area AREA 2 is revised with the data in the buffer j or the first index data. Thus, the printing on the document and the revision of the data in the IC card is performed, and the document and the IC card are dispensed from the ATM (Steps n 32 and n 34). If there is no data in the memory of the IC card to be printed, the sequence in FIG. 4 is completed by jumping from step n 18 to n 34 as it is and the IC card is returned.

In this embodiment, the area number of the area in which the latest transaction data already printed is stored is directly stored in the memory of the IC card as the second index data, but alternatively its next area number or the area number of the area in which the transaciton data is stored to be firstly printed out may be stored as the second index data at the second area AREA 2. The first area AREA 1 also may store as the first index data the area number of the area following to the area in whcih the latest transaction data is stored, viz., the area number of the area in which the data in the next transaction should be stored.

In the foregoing embodiment, all transaction data which are not yet printed out in the previous several transactions are printed out, so that it can be avoided to print the same transaction data repeatedly or to produce any transaction data which fails to be printed. By keeping such printing results, the operator can confirm all shopping data by the IC card as a continual information. The printing results or printed documents may be utilized for various applications, such as housekeeping book, warehouse stock management, sales data management and so forth.

Figure 4:
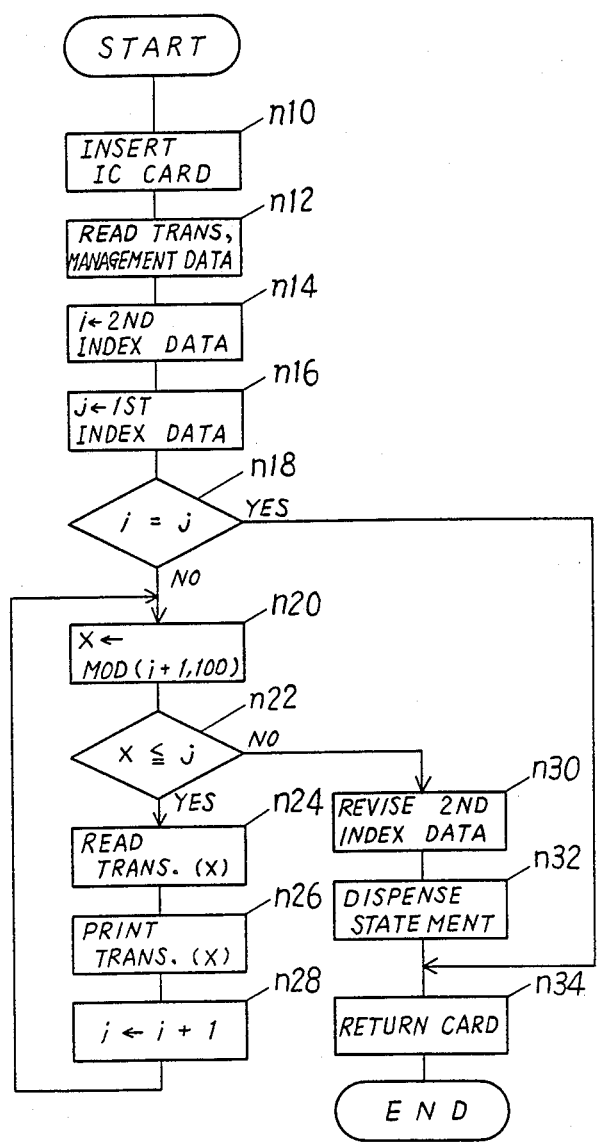
FIG. 4 is a flow chart of the automatic teller machine of FIG. 1.
Figure 6:
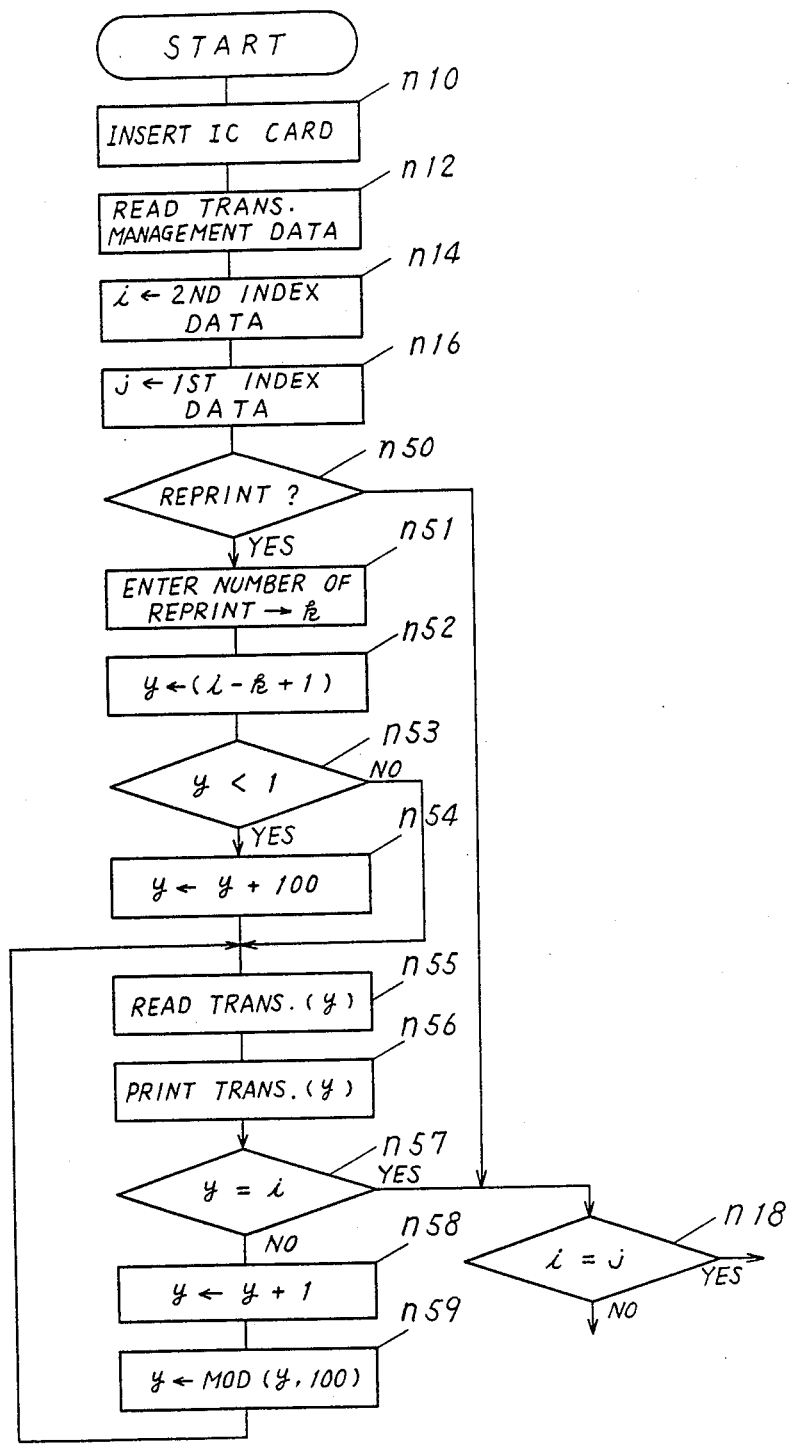
FIG. 6 is a modified flow chart of the machine of FIG. 1 as a modification of this invention.

In FIG. 6 there is shown a flow chart of a modification of the embodiment of FIG. 4 as a modified embodiment of this invention. This modified embodiment allows the operator to optionally request reprint of the transaction data once printed in previous operations as her or his desire. The reference numerals of this embodiment are represented by the same reference numerals as those of the above-mentioned embodiment about the same components or steps, and the componets in FIGS. 1 through 3 are applied to this modified embodiment as they are.

If the IC card is inserted into the ATM 100, transaction management information data including second and first index data are read out from the card to be entered into the buffers i and j as illustrated in FIG. 4 (Steps n 10 through n 16). Then, a message is displayed on the display 5 to inquire if the operator requests reprinting on an inserted document through the inlet 8a about the transaction data which were once printed in the previous operations (Step n 50). If the operator request such reprint and enters the number (k) of the past printed transactions through the touch panel 6 for reprint in accordance with an instruction text on the CRT5, an YES response is produced and the number (k) is entered into a buffer k (Step n 51). The result of the value of the second index data subtracted by the value of the buffer k and added by the value "1" is entered into a buffer y to designate the storage area in which the first transaction data should be firstly reprinted retroactively, and a message "REPRINT" is printed on the inserted document as shown in FIG. 7 to indicate that the following data are reprinted. If the value of the buffer y is zero or minus, an YES response is produced in a step n 53, and the result of the value of the buffer y added by the value "100" is replaced to the buffer y (Step n 54). Then, the transaction data stored in the storage area DATA y in the transaction data area is read out and printed on the document (Step n 55 and n 56). Unless the value of the buffer y reaches the value of the buffer i, the result of the vlaue of the buffer y incremented by the value "1" is replaced to the buffer y (Step n 58). As explained in the step n 20 of FIG. 4, the remainder of the value of the buffer y divided by the value "100" is replaced to the buffer y and the sequence is returned to the step n 55 to be repeated until the value of the buffer y reaches the value of the buffer i, viz. the transaction data to be reprinted becomes that designated by the second index data, an YES response is produced from the step n 57 for application Step n 18.

Assuming that the last print area designated by the second index data is the area DATA 30 and the operator requests the last forty transactions to be reprinted for her or his confirmation, the value of the buffer y in the step n 52 is "−9" and in the step n 54 the area DATA 91 is designated, so that the transaction data is started to be reprinted from the area DATA 91 and the forty transactions up to the area DATA 30 are reprinted. Then, the sequence goes to the step n 18. If the area DATA 30 is designated by the second index data in the AREA 2 and the operator request the last three transactions to be reprinted, the value of the buffer y is "28" and the data in the area DATA 28 is stated to be reprinted, whereby the reprint of the past three transactions shown in FIG. 7 is completed. If the operator does not reuest the reprint of any transaction data once printed, the sequence form the Step n 50 is applied to Step n 18.

Unless the area designated by the second index data is equal to that designated by the first index data, a NO response is produced to print the message "NEW PRINT" shown in FIG. 7 to indicate that the following data are not previously printed and applied to the Step n 20 of FIG. 4. An YES response from the Step n 18 of FIG. 6 also continues to the Step n 34 in the same sequence as that of FIG. 4.

Thus, according to this modified embodiment, even if the operator has lost the former printed document or statement and wants to know the transaction data once printed in the former operations, she or he may know them without confusing for her or his convenience. The system of this modified embodiment also has the advantages that even if a customer's bankbook is printed with the sum of withdrawal and deposit transactions without each transaction due to the banker's choice, the IC card is recorded with each of a predetermined number of transactions and the customer can know each of any past transactions classified by reprinting and new printing.

While the foregoing embodiments of this invention have been described in detail herein and shown in the accompanying drawings, it will be evident that various further modifications are possible without departing from the scope of this invention.

What is claimed is:

1. A data storage unit system for accepting a data storage unit storing a series of data therein, comprising
    first reading means for reading a first index data relating to the address of a storage area of the storage unit in which the latest data is stored,
    second reading means for reading a second index data relating to the address of a storage area of the storage unit in which the last printed data is stored, and
    printing means in response to said first and second index data for printing out the data not yet printed out previously.

2. A data storage unit system according to claim 1 in which said data storage unit is an IC card.

3. A data storage unit system according to claim 1 in which said data storage unit is assigned to a customer and stores the data of a series of transactions.

4. A data storage unit system according to claim 1 which further comprises judging means for comparing said second index data with said first index data to designate a series of data to be printed by said printing means.

5. A data storage unit system according to claim 1 which further comprises reprinting means for reprinting the data once printed which are designated by said second index data.

6. A data storage unit for storing a series of data comprising
    a predetermined number of data storage areas for storing said series of data.
    a first storage area storing a first index data relating to the address a first area of said data storage areas in which the latest data is stored, and
    a second storage area storing a second index data relating to the address of a second area of said data storage areas in which the last printed data is stored.

* * * * *